US011819146B2

(12) United States Patent
Khodaparast et al.

(10) Patent No.: US 11,819,146 B2
(45) Date of Patent: *Nov. 21, 2023

(54) FLEXIBLE HARDGOODS WITH ENHANCED PEEL REMOVABILITY

(71) Applicant: 3M INNOVATIVE PROPERTIES COMPANY, St. Paul, MN (US)

(72) Inventors: Payam Khodaparast, Minneapolis, MN (US); Erik M. Anderson, Hugo, MN (US); Kevin W. Weber, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,207

(22) Filed: Oct. 12, 2022

(65) Prior Publication Data

US 2023/0032017 A1    Feb. 2, 2023

Related U.S. Application Data

(63) Continuation of application No. 17/296,414, filed as application No. PCT/IB2019/061033 on Dec. 18, 2019, now Pat. No. 11,503,929.

(Continued)

(51) Int. Cl.
*A47G 1/17* (2006.01)
*A47G 25/32* (2006.01)
*A47G 29/087* (2006.01)

(52) U.S. Cl.
CPC ............... *A47G 1/17* (2013.01); *A47G 25/32* (2013.01); *A47G 29/087* (2013.01)

(58) Field of Classification Search
CPC ........ A47G 1/17; A47G 25/32; A47G 29/087; A47G 1/20; A47G 25/0607; A47G 1/162;
(Continued)

(56) References Cited

U.S. PATENT DOCUMENTS 4,472,480 A     9/1984  Olson
4,615,084 A *  10/1986  Erb ..................... A44B 18/0015
                                                        264/296

(Continued)

FOREIGN PATENT DOCUMENTS

DE          3331016 C2     7/1992
JP       2001012688 A      1/2001
(Continued)

OTHER PUBLICATIONS

Encyclopedia of Polymer Science and Engineering, Wiley-Interscience Publishers, 1988, vol. 13, Table of contents, 3 pages.
(Continued)

*Primary Examiner* — Muhammad Ijaz
(74) *Attorney, Agent, or Firm* — Kenneth B. Wood

(57) ABSTRACT

The present disclosure provides adhesive mounting articles that can be removed from surfaces without damage by having reduced contribution of a hardgood to the peel force generated by the adhesive article during removal. In some instances, this can be accomplished by a hardgood that is flexible in a peel direction and rigid in a weight hanging direction. Such hardgoods may include a plurality of minimally connected body segments arranged about the transverse axis of the hardgood body.

28 Claims, 6 Drawing Sheets

Related U.S. Application Data

(60) Provisional application No. 62/781,888, filed on Dec. 19, 2018.

(58) Field of Classification Search
CPC .............. F16B 11/006; C09J 2203/37; C09J 2425/006; C09J 2455/006; C09J 2467/006; C09J 2469/006; C09J 2471/006; C09J 2477/006; C09J 7/22
USPC .......................... 248/683, 467, 205.3, 205.1
See application file for complete search history.

(56) References Cited

U.S. PATENT DOCUMENTS

| | | | |
|---|---|---|---|
| 4,726,982 | A | 2/1988 | Traynor et al. |
| 4,736,048 | A | 4/1988 | Brown et al. |
| 4,980,443 | A | 12/1990 | Kendziorski et al. |
| 5,082,706 | A | 1/1992 | Tangney |
| 5,965,256 | A | 10/1999 | Barrera |
| 6,120,867 | A | 9/2000 | Hamerski et al. |
| 6,692,807 | B2 | 2/2004 | Bries et al. |
| 6,730,397 | B2 | 5/2004 | Melancon et al. |
| 6,835,452 | B1 | 12/2004 | Hamerski et al. |
| 9,920,786 | B2 | 3/2018 | Schneider et al. |
| 2005/0137375 | A1 | 6/2005 | Hansen et al. |
| 2005/0139739 | A1* | 6/2005 | Hamerski ............... F16B 2/005 248/206.5 |
| 2008/0257841 | A1* | 10/2008 | Abernathy ............... A47G 1/20 211/87.01 |
| 2009/0211066 | A1* | 8/2009 | Swanepoel ............... A47G 1/17 24/584.1 |
| 2012/0202035 | A1 | 8/2012 | Xie et al. |
| 2013/0167332 | A1* | 7/2013 | Terada ............... A44B 18/0065 24/450 |
| 2014/0217250 | A1* | 8/2014 | Huynh ..................... H02G 3/14 248/205.3 |
| 2014/0335299 | A1 | 11/2014 | Wang et al. |
| 2015/0034104 | A1 | 2/2015 | Zhou et al. |
| 2016/0068722 | A1 | 3/2016 | Schmitz-Stapela et al. |
| 2022/0022668 | A1* | 1/2022 | Khodaparast ...... A47G 25/0607 |

FOREIGN PATENT DOCUMENTS

| | | |
|---|---|---|
| JP | 2001037522 A | 2/2001 |
| JP | 3085020 | 12/2001 |
| JP | 2014074489 A | 4/2014 |
| WO | 19914021157 | 9/1994 |
| WO | 2004041952 A1 | 5/2004 |
| WO | 2010116313 A1 | 10/2010 |
| WO | 2014041952 A1 | 3/2014 |
| WO | 2015035556 A1 | 3/2015 |
| WO | 2015035960 A1 | 3/2015 |
| WO | 2017136188 A1 | 8/2017 |
| WO | 2017136219 A1 | 8/2017 |
| WO | 2017136432 A1 | 8/2017 |
| WO | 2018039584 A1 | 3/2018 |
| WO | 2019005831 A1 | 1/2019 |
| WO | 2019040820 A1 | 2/2019 |
| WO | 2020039372 A1 | 2/2020 |

OTHER PUBLICATIONS

Encyclopedia of Polymer Science and Technology, Interscience Publishers, 1964, vol. 1, Table of contents, 24 pages.
International Search report for PCT International Application No. PCT/IB2019/061033 dated Apr. 10, 2020, 3 pages.

* cited by examiner

FLEXIBLE HARDGOODS WITH ENHANCED PEEL REMOVABILITY

TECHNICAL FIELD

The present disclosure generally relates to peelable adhesive articles that are capable of attaching or adhering to a substrate and that can be removed from the substrate without causing damage to the substrate. The present disclosure also generally relates to methods of making and using such adhesive articles.

BACKGROUND

The revolutionary Command® Adhesive Strip products are a line of stretch removable adhesive strips that hold strongly on a variety of surfaces (including paint, wood, and tile) and that remove cleanly—no holes, marks, or sticky residue. These products generally have utility in bonding to various surfaces or substrates for numerous applications.

In general, these products include a stretch release adhesive composition disposed on tape or other backings. Stretch releasable adhesives are high performance pressure-sensitive adhesives that combine strong holding power with clean removal and no surface damage. Stretch releasable adhesive products are designed to firmly adhere an article, such as a hook (to hold a picture or an article of clothing) or other decorative or utilitarian element, to a surface (an adherend), yet remove cleanly when pulled away from the architectural surface at a low angle. The clean removal aspect means that a tacky and/or unsightly residue is not left behind on the surface after removal of the stretch release adhesive and that no damage to the surface occurs during the removal process. During the process of stretch release removal, the adhesive layer typically remains adhered to the tape backing as the backing is stretched, but releases from the surface (adherend).

Peelable adhesive technology has also been introduced into products for mounting. Some exemplary commercially available peelable mounting products (e.g., Jimmy Hook™ products, GeckoTech™ products, Elmer's Freestyle™ products, and Hook Um™ products) rely on both suction technology and frictional or dry adhesives to generate the mounting device's holding power. The mounting devices include a semi-rigid plastic backing and a hardgood (e.g., a rigid hook), both of which are integrated as a one-piece article support. The rigid hook is permanently attached to a first major planar surface of the semi-rigid plastic backing. The second major planar surface of the backing can be adhered to a wall surface. The second major planar surface includes one or more of suction technology (e.g., numerous microsuction or nanosuction elements) and/or a frictional adhesive (in which the backing is impregnated with a rubber-based adhesive to increase friction between the substrate and backing) or dry adhesive (which relies on van der Waals forces). The entire construction can, thereafter, be removed by peeling.

SUMMARY

Existing peelable adhesive products often do not work well on various surfaces, including, for example, painted surfaces and rough surfaces (e.g., drywall). Additionally, the existing peelable products can exhibit low shear strength and thus can hold little weight or alternatively require a relatively thick construction, which can cause an increase in the potential for damage when such products are removed from an adherend. Moreover, the mounting devices typically include a relatively rigid hardgood used to mount the desired object, which can increase the peel force necessary to remove the mounting device. This difficulty in removal often subjects the user to at least a multiple removal steps or requires the use of multicomponent constructions that tend to increase manufacturing complexity and cost. Attempts have been made to replace existing backings with those having lower stiffness (modulus) to reduce the peel force upon removal. Soft, elastic backings, for example, have been shown to result in lower peel forces, which correlate with appreciable stretch (strain) of the adhesive at release. Even with advantageous modifications to the backing materials, the present inventors recognized that adhesive articles remained difficult to remove in a single step and still experienced visible damage. As such, the inventors of the present disclosure sought to formulate peelable mounting products with at least one of higher shear strength, ability to work well on painted or rough surfaces, that are capable of consistently holding higher weights, and/or that are easier for the user to remove from the substrate, all without damaging the substrate to which they are applied.

The inventors of the present disclosure recognized that the existing peel release adhesive products could be improved or enhanced by reducing or eliminating the contribution of the hardgood to peel force generated by the adhesive during removal. In some instances, this can be accomplished by increasing the flexibility of the hardgood in one or more directions offset from the direction of gravitational force provided by an object to be mounted. The increased flexibility tends to reduce the peel force necessary to remove the product by easing the peel force required to separate the hardgood from the substrate; the adhesive articles of the present disclosure can accordingly capitalize on myriad adhesive constructions without deleteriously impacting damage free removability. In some instances, the enhanced construction of the hardgood allows the adhesive articles to hold more weight. In some embodiments, the enhanced performance permits the adhesive articles to be used on new surfaces (e.g., delicate paper). In some embodiments, the enhanced removability increases or enhances the product performance on certain surfaces (e.g., rough or textured surfaces such as, for example, wallpaper, drywall, etc.).

The inventors of the present disclosure also recognized that providing a hardgood that has anisotropic flexibility is a novel and effective method to increase performance of the adhesive article while enhancing the damage-free features of the product.

In one aspect, the present disclosure provides an adhesive article comprising a flexible body and an adhesive disposed adjacent a rear major surface of the body. The flexible body includes a plurality of body segments, each including a linear segment and a related connector element. The body segments are spaced apart at a certain frequency and connected only at discrete locations displaced from the center of the body. The connections can be located adjacent an edge region of the body and serve to connect two adjacent segments. In some implementations, the body segments oscillate about a central axis and include linear elements arranged substantially in parallel. Such implementations may include arcuate connector elements. The flexible body may further include a projection for mounting an object. The projection may include projection segments, spaced apart at a certain frequency and connected at an edge region.

The adhesive may be disposed directly on a major surface of the body segments. In other implementations, the flexible body may include a backplate having at least one of length and width dimensions greater than the corresponding dimensions of the body segments. The backplate may be made monolithic with the body segments or may be adhered or otherwise coupled to the body segments. The adhesive in such implementations will be disposed on a rear major surface of the backplate.

As used herein, "layer" means a single stratum that may be continuous or discontinuous over a surface. As used herein, the terms, "height", "depth", "top" and "bottom" are for illustrative purposes only, and do not necessarily define the orientation or the relationship between the surface and the intrusive feature. Accordingly, the terms "height" and "depth", as well as "top" and "bottom" should be considered interchangeable.

The terms "comprises" and variations thereof do not have a limiting meaning where these terms appear in the description and claims. The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As recited herein, all numbers should be considered modified by the term "about". As used herein, "a", "an", "the", "at least one", and "one or more" are used interchangeably. Thus, for example, an adhesive article comprising "an" adhesive layer can be interpreted as a core comprising "one or more" adhesive layers. Also herein, the recitations of numerical ranges by endpoints include all numbers subsumed within that range (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure is presented by way of representation and not limitation. It should be understood that numerous other modifications and embodiments can be devised by those skilled in the art, which fall within the scope and spirit of the principles of the disclosure.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

The present disclosure generally relates to adhesive articles that can be removed from a substrate, wall, or surface (generally, an adherend) without damage to the adherend or at least some components of the article (e.g., the flexible body as described below). As used herein, the terms "without damage" and "damage-free" or the like means the adhesive article can be separated from the substrate without causing visible damage to paints, coatings, resins, coverings, or the underlying substrate and/or leaving behind residue. Visible damage to the substrates can be in the form of, for example, scratching, tearing, delaminating, breaking, crumbling, straining, and the like to any layers of the substrate. Visible damage can also be discoloration, weakening, changes in gloss, changes in haze, or other changes in appearance of the substrate.

The adhesive article includes (1) one or more peelable adhesive layers adjacent to (2) a flexible mounting body. As used herein, the term "peelable" means that the adhesive article can be removed from a substrate or surface by peeling at angle of between about 1° and about 180°. In some embodiments, the adhesive article can be removed from a substrate or surface by peeling at angle of between 30° to 120°. In some embodiments, the adhesive article can be removed from a substrate or surface by peeling at angle of at least about 35°.

Figure 1:
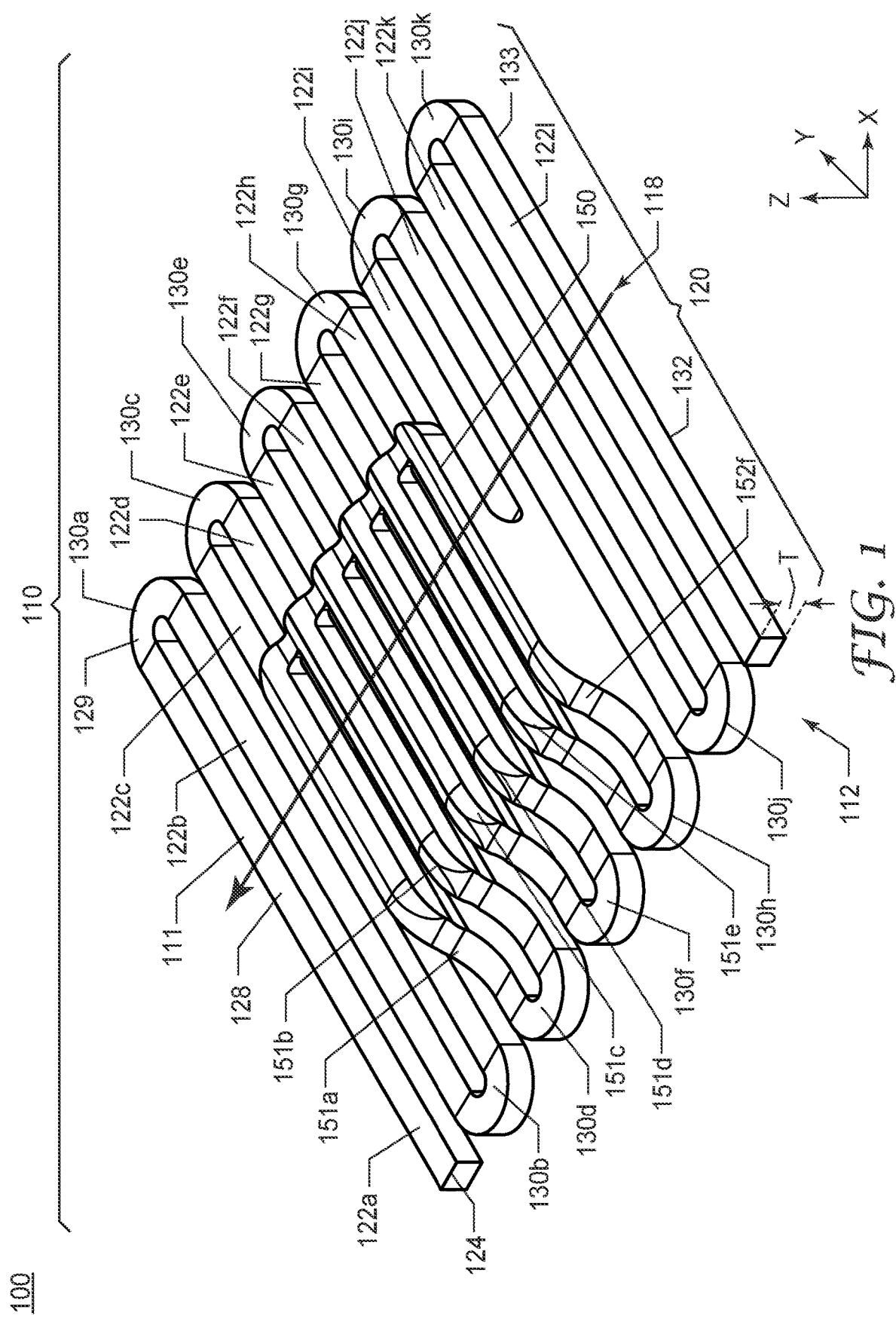
FIG. 1 is a perspective view of one embodiment of an exemplary adhesive article of the type generally described herein.
Figure 2:
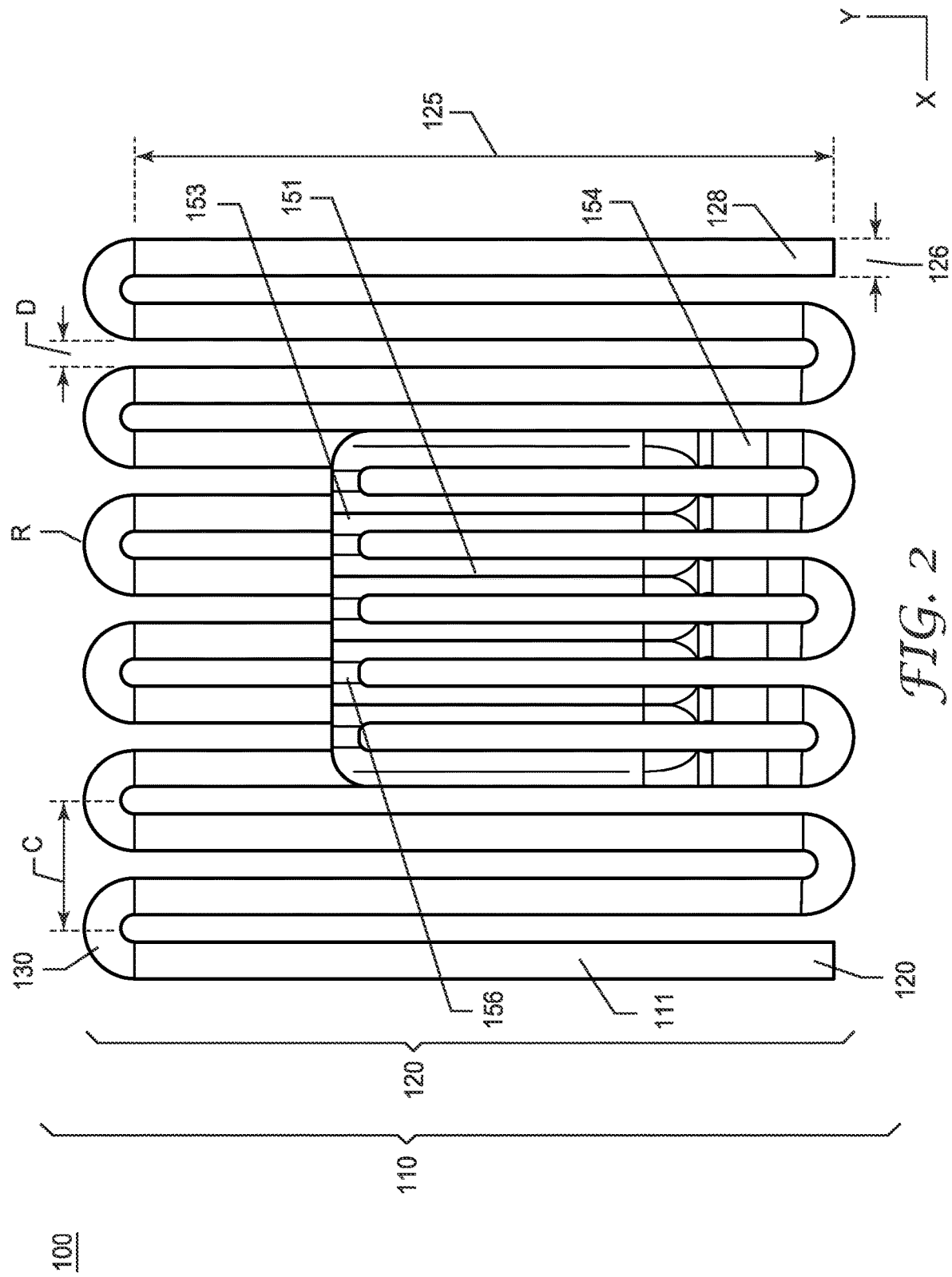
FIG. 2 is a front plan view of the adhesive article of FIG. 1.

FIGS. 1 and 2 depict an exemplary embodiment of an adhesive article 100 as generally described herein. The adhesive article 100 includes a flexible mounting body 110 having first and second opposed major surfaces 111 and 112. FIG. 1 depicts the adhesive article 100 in top plan view, with an adhesive layer 140 disposed beneath the body 110. In some embodiments, the adhesive 140 can be generally optically clear such that is not particularly visible on the surface of the body 110. In other embodiments, the adhesive layer 140 can be generally opaque. As seen in FIG. 2, the flexible body 110 has a generally rectangular shape defined by an upper edge, a lower edge, and side edges. The shape of the flexible body 110 is not particularly limited and can include any suitable shape or combination of shapes.

The flexible mounting body 110 includes a plurality of body segments 120 that cooperate to define the shape and perimeter of the body 110. The body segments 120 each include a linear segment 122 and a shared connector segment 130. The flexible body is accordingly comprised of a plurality of linear segments 122a-122l, and a corresponding plurality of connector segments 130a-130k. The plurality of linear segments 122a-122l are each spaced from one another by a certain pitch (e.g., edge to edge distance) "D" and are directly connected to any adjacent linear segments only at connector segments 130a-130k. The connector segments 130 couple adjacent linear segments at their respective distal ends 123 (e.g., connector 130a coupling segments 122a and 122b) or at their respective proximal ends 124 (e.g., connector 130g coupling segment 122b and 122c). Accordingly, the linear segments 122 are free to flex in at least the horizontal direction during attempted peel removal of the adhesive article 100.

As shown in FIGS. 1 and 2, the linear segments 122a-122l are arranged in an oscillating or serpentine manner about a central, horizontal axis 118 of the body 110. The linear segments 122a-122l extend perpendicular to the central axis 118 and are continuous in the y-direction. In other implementations, the linear segments 122a-122l need not be arranged in substantial parallel and instead may take on a sinusoidal configuration. Alternatively, the linear segments 122a-122l may be arranged as a triangular wave, a sawtooth wave, or in a radial pattern, to identify a few non-limiting examples.

Figure 3:
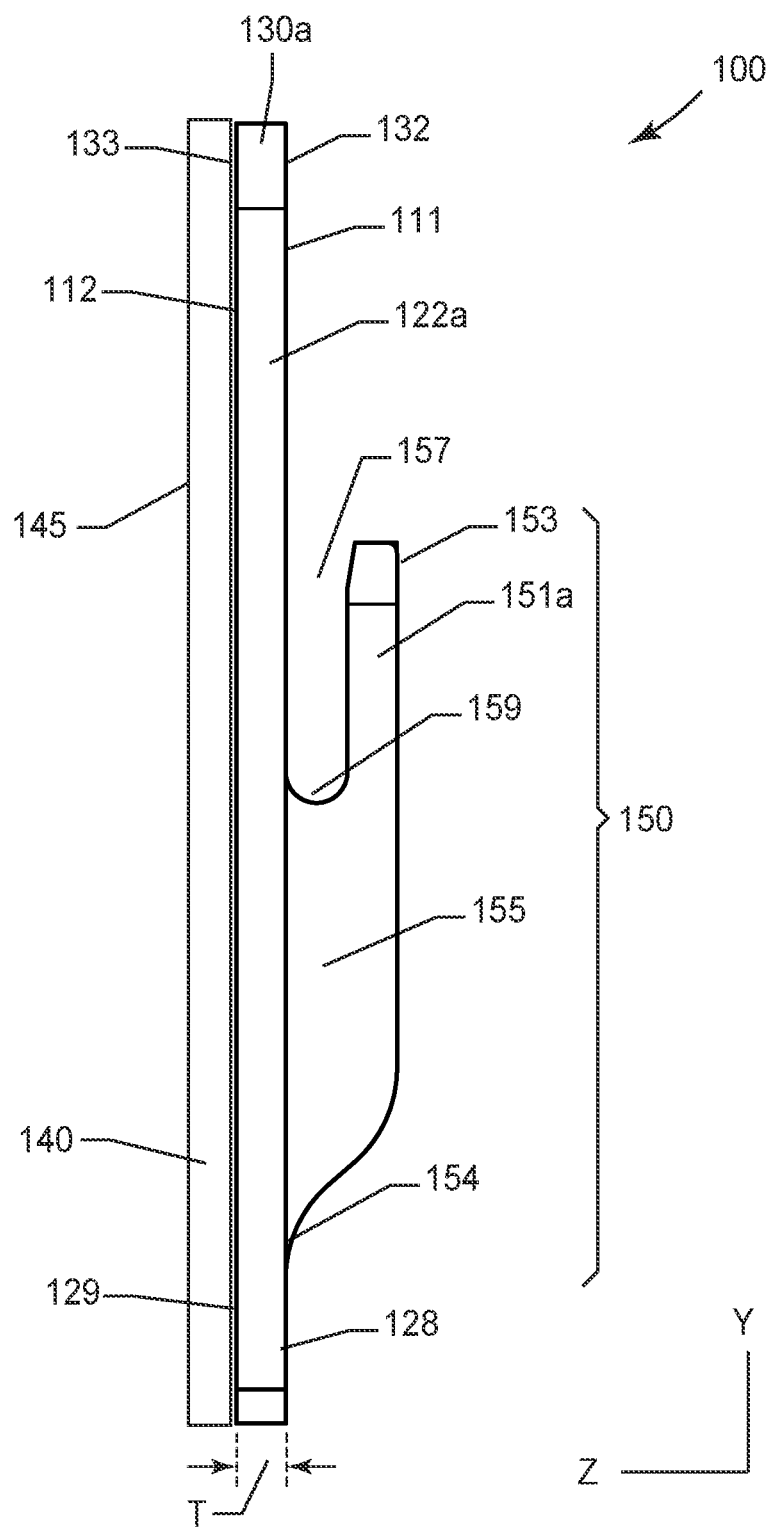
FIG. 3 is a side view of the adhesive article of FIGS. 1-2.

A Cartesian x-y-z coordinate system is included with FIGS. 1-3 for reference purposes. The first and second major surfaces 111, 112 extend generally parallel to the x-y plane, and the thickness "T" of the body 110 corresponds to the z-axis. The body 110 includes a transverse direction, generally along the x-axis and a longitudinal direction, generally along the y-axis. The arrangement of linear segments 122a-122l include a defined pitch "D" between nearest-neighboring, adjacent linear segments in the transverse direction. The serpentine arrangement of body segments 120 in flexible body 110 results in the pitch "D" being substantially the same along the length of each relevant linear segment. Flexibility can be affected by increasing or decreasing the pitch "D" (i.e., frequency) between adjacent segments or along the length of adjacent segments, which tends to also change the size of and pitch "C" between the center of adjacent connector segments 130). Linear segments 122 may be separated by a pitch D in an exemplary range of between about 0.02 inches and 0.3 inches, while exemplary connectors may be separated by a pitch C in an exemplary range of about 0.2 to 1.4 inches.

Flexibility may also be affected changing the arrangement of the body segments or by increasing or decreasing the number of linear segments 122 (and corresponding connectors 130), meaning that the absolute number of linear segments is not critical; more than three or more than five can provide sufficient performance, depending on the intended end use.

The connectors 130 can be arcuate as depicted and can have a resultant radius or combinations of radii "R". In some embodiments and as shown in FIGS. 1-4, each connector segment 130 of the plurality of connectors 130a-130k has the same radius or combination of radii R. In other embodiments, the radius R of any number of connectors 130a-130k of the plurality of connector segments may be smaller or larger than other connectors 130a-130k. Such a configuration would result in a different pitch between certain linear segments 122. One or more connectors 130a-130k may take on other suitable shapes, such as squared, rectangular, and triangular. Having a curved and arcuate shape, however, can reduces the amount of material residing perpendicular to the linear segments 122a-122l, which can result in improved flexibility in certain implementations of the present disclosure. Exemplary connectors 130 can have an exemplary range of radii R between about 0.05 inches and 0.5 inches.

The connectors 130a-130k are disposed adjacent the perimeter of the flexible body 110 and spaced from the aligned parallel to a desired peel front. In FIGS. 1-4, the desired peel front is the transverse direction across the center of flexible body 110. The flexible body 110 may be removed (i.e., peeled) at other angles that are oblique to the transverse axis, though the body segments 120 resist peel in directions substantially parallel to the longitudinal direction. This designed resistance allows the flexible body to hold mounting weight and demonstrate requisite shear strength while still permitting manipulation of the segments to ease removal.

As depicted in of FIGS. 1 and 3, the linear segments 122a-122l are generally square in cross-section, however linear segments of the flexible body may have a variety of cross-sectional shapes. For example, the cross-sectional shape of one or more linear segments 122a-122l may be a polygon (e.g., square, tetrahedron, rhombus, trapezoid), which may be a regular polygon or not, or the cross-sectional shape of a linear segment can be curved (e.g., round or elliptical). Each linear segment 122 possesses a length 125 and a width 126, with the length typically being substantially greater than the width. The comparatively greater length aids in the shear holding power of the flexible body when weight is applied in the y-direction. In one exemplary embodiment, a ratio of the length to the width is at least 15:1. An exemplary range of lengths 125 for each linear segment is between about 0.8 inches to 6 inches, while an exemplary range of widths 126 is between about 0.05 inches and about 0.3 inches.

Each body segment 120 includes a cross-sectional thickness "T" in the z-direction. In the depicted mounting article 100, the cross-sectional thickness is continuous throughout the length of the flexible body 110. In other embodiment, the cross-sectional thickness T may be thicker at the connectors than the linear segments or vice versa. In some such embodiments, the cross-sectional thickness may include a tapering thickness as either the center or the edge of the body 110 is approached. In some embodiments, the body segments 120 have a maximum thickness, that is at the thickest point in the z-direction, of between about 2 mils and about 200 mils.

The first major surfaces 128, 132 of the linear segments 122a-122l and connectors 130a-130k define the front major surface 111 of the flexible body 110, the second major surfaces 129, 133 of the same while a second body plane 118 define the rear major surface 112 of the flexible body 110. The major surfaces 128, 132 also cooperate to define a first body plane and the second major surfaces 129, 133 cooperate to define a second body plane. The body planes as depicted are in parallel but may intersect and form an oblique angle in other embodiments.

A mounting projection 150 extends outwardly from the front major surface 111 of the flexible body 110. The projection 150 includes a plurality of mounting segments 151a-151f coupled to a corresponding linear segment 122.

The mounting segments 151a-151f, like linear segments 122, are coupled to one another only at a single location, here the distal (i.e., top) edge 152 of the projection 150. The single point of connection allows the article 100 to flex at the mounting projection 150 as well as the remainder body 110. A recess 157, formed between an upper portion of the linear segments 122d-122i and the mounting segments 151a-151f, can accept a thread or structure attached to an object to be mounted. The mounting segment 151 and corresponding linear segment 122 form an integral structure, wall 155, from the proximal end 154 of projection 150 to the bottom 159 of the recess 157. An edge of the wall 155 for each linear segment-mounting segment combination thus provides the bottom surface 159 for the recess 157.

The distal end 153 of each mounting segment 151 extends in a plane substantially parallel to its corresponding linear segment 122.

Figure 4:
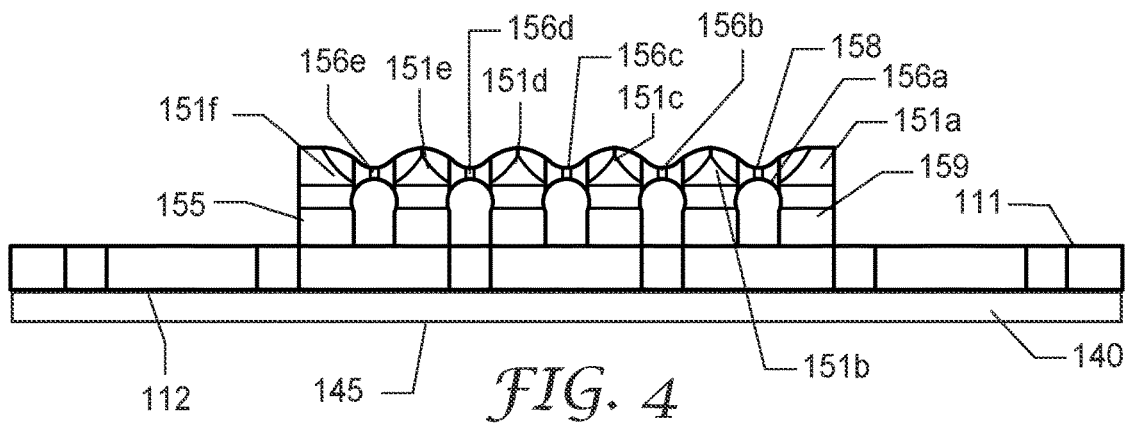
FIG. 4 is a top plan view of the adhesive article of FIGS. 1-3.

Turning to FIG. 4, the mounting segments 151a-151f are fixed to another through mounting bar 156a-156e disposed at the distal edge 152. As depicted, the bars 156a-156e feature an inverse scalloped configuration, in that each bar 156 is thinner than the corresponding mounting segment 151 and, when viewed from the distal edge down, produces a lens-shaped well having an apex 158 located below the outermost face of the mounting projection 150. In other embodiments (not shown), one or more of the bars 156a-156e possess the same thickness as the mounting segments 151a-151f. It is presently preferred, however, to include a bar having a reduced thickness, which tends to increase the flexibility of the mounting projection and leads to easier removal of the adhesive article 100 from a substrate.

In presently preferred embodiments, all elements of the flexible body are unitary or monolithic, in that they are made of a single piece of material. In other embodiments, the constituent elements may be made separately and joined together to form the flexible body.

A peelable adhesive layers 140 can be disposed on the rear major surface 112 of the flexible body 110, as clearly depicted in FIGS. 3 & 4. The adhesive layers 140 can be a single layer or can be multilayer. The adhesive layer 140 can each be continuous or discontinuous (e.g., patterned) across the major surface of the body 110. An available bond area for the article 100 includes the total area defined by the outer surface 145 of the adhesive layer. In embodiments lacking a backplate as detailed below, the available bond area may or may not include the gap between linear segments 122. The available bond area of the major surfaces 145 is used to couple the adhesive mounting article 100 to, for example, a wall surface. In other exemplary embodiments, an article 100 may lack an adhesive layer on the second major surface 112. For instance, the second major surface may include one component (e.g., a hook or loop structure) of a separable connector. Suitable separable connectors may be found in U.S. Pat. No. 6,692,807 (Bries et al.) and U.S. Pat. No. 9,920,786 (Runge et al.).

The adhesive layer 140, as depicted, is no more than coextensive with the major surfaces 111, 112 of the flexible body. In other embodiments not pictured, the adhesive layer can extend beyond the perimeter of the body 110. The thickness of the adhesive layer(s) is not particularly limited but is typically substantially continuous across the second major surface 112. In presently preferred implementations, the thickness of the adhesive layer is no greater than 95% of the body thickness "T", no greater than 90%, no greater than 80%, no greater than 75%, no greater than 60%, no greater than 50%, no greater than 40%, no greater than 30%, no greater than 20%, and in some embodiments no greater than 10% of the body thickness "T". In typical embodiments, the adhesive layer 140 has a thickness of between about 1 mil and about 8 mils.

The adhesive layer 140 may include a backing or may be backing free. Backing free adhesive constructions are described, for example, in US Publication No. 2016/0068722 (Schmitz-Stapela et al.). The adhesive construction 110 may include one or more adhesive layers disposed on a core, as described in International Application No. PCT/US2018/047864 (Krull et al.), assigned to the present assignee. Other suitable backing materials can be found in PCT Application Nos. PCT/US2017/016039 (Runge et al.) and PCT/US2018/039553 (Hoffman et al.). The adhesive layer 140 may be single layer or multilayer. The backings and/or core layers may likewise be single layer or multilayer.

Despite lacking continuous material throughout, the flexible body 110 can still provide sufficient strength so that, depending on the specific application, the structural integrity will not fail during use of the adhesive article 100 for mounting an object on a mounting surface. The body 110 can advantageously provide a static shear strength and rigidity in the y-direction sufficient for supporting an object and providing a suitable level of resiliency to the article 100.

Figure 5:
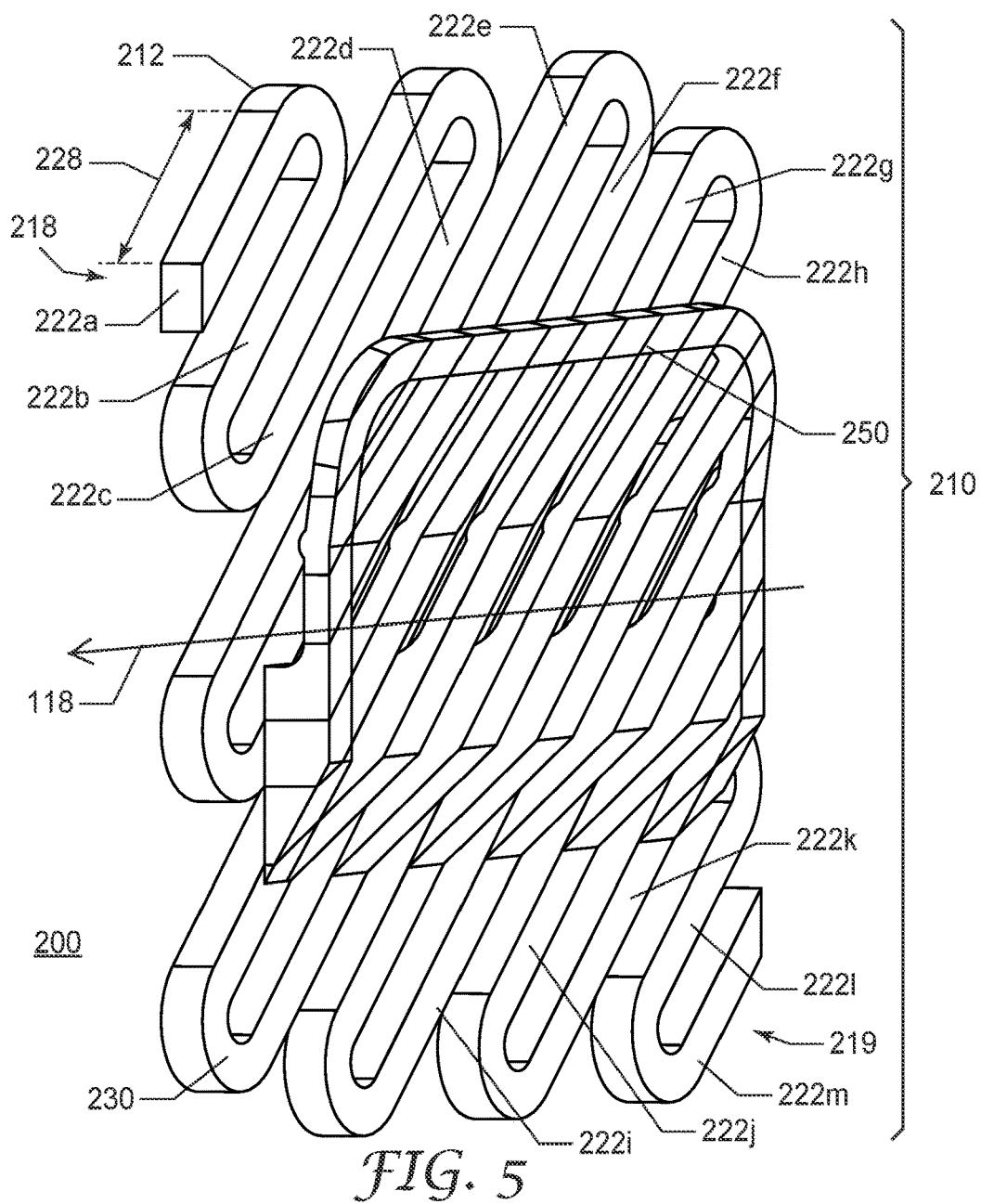
FIG. 5 is a perspective view of another embodiment of an exemplary adhesive article of the type generally described herein.

Another exemplary embodiment of an adhesive article 200 is depicted in FIG. 5. Except as otherwise noted, all other considerations regarding the adhesive article 100 apply equally to adhesive article 200. Like the adhesive article of FIGS. 1 and 2, the adhesive article 200 includes a flexible body 210 and a first peelable adhesive layer (not shown) on a second major surface 212 of the body 210. The flexible body 210 includes a plurality of body segments 220, each including a linear segment 222 and a shared connector 230.

The linear segments 222a-222l (and corresponding mounting segments 252a-252i) extend at a generally 45-degree angle relative to the transverse, central axis 218. As the overall shape of the flexible body 210 is still rectangular, the length 228 of any given linear segment 222 is either larger or smaller than it nearest-neighboring segments; only adjacent segments 222f-222h have the same length. The length 228 of the segments 222a-222g generally increases from the segment 222a as the center segment 222g is approached from an upper corner 218 and decreases again as segment 222m is approached from segment 222h towards the lower right corner 219. This particular arrangement of body segments 222a-222m promotes the peeling of the flexible body 210 from either the upper left corner 218 or lower right corner 219.

Figure 6:
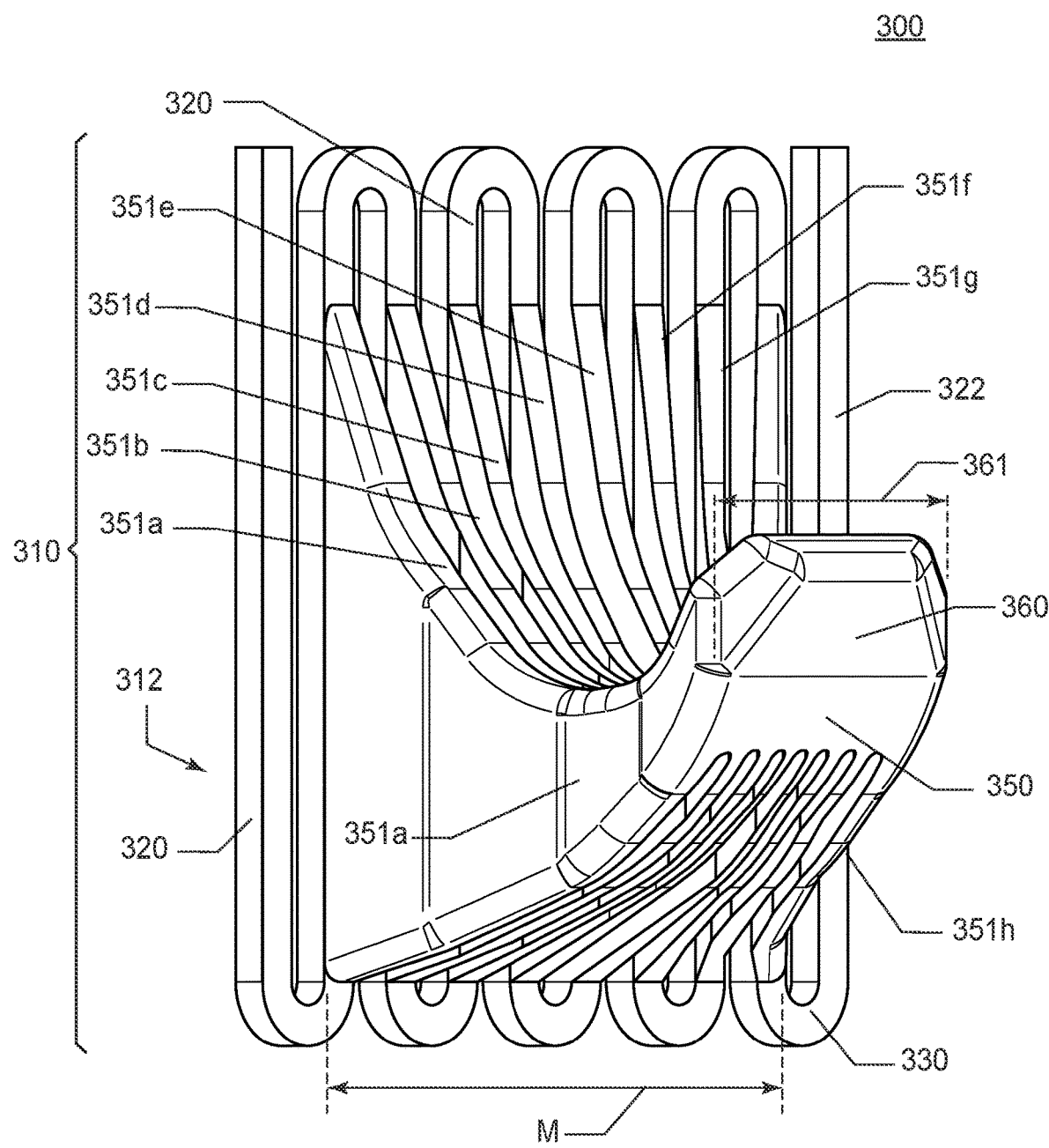
FIG. 6 is a perspective view of another embodiment of an exemplary adhesive article of the type generally described herein.

Another exemplary embodiment of an adhesive article 300 is depicted in FIG. 6. Except as otherwise noted, all other considerations regarding the adhesive articles 100 and 200 apply equally to adhesive article 300. The adhesive article 300 includes a flexible body 310 and a first peelable adhesive layer (not shown) on a second major surface 312 of the body 310. The flexible body 310 includes a plurality of body segments 320, each including a linear segment 322 and a shared connector 330.

Unlike the adhesive articles 100 and 200, the mounting segments 351a-351h extending outward from the front major surface 311 converge to form a hook 350. The hook 350 includes an outer end 360 having a solid construction, in that all mounting segments 351 are made integral. The outer end 360 has a width 361 less than the distance "M" between mounting segments 351a and 351h. The consolidation of mounting segments 351a-351h at the outer end permits additional rigidity in the y-direction to the mounting projection, without deleteriously sacrificing the overall flexibility of the article 300.

Figure 7:
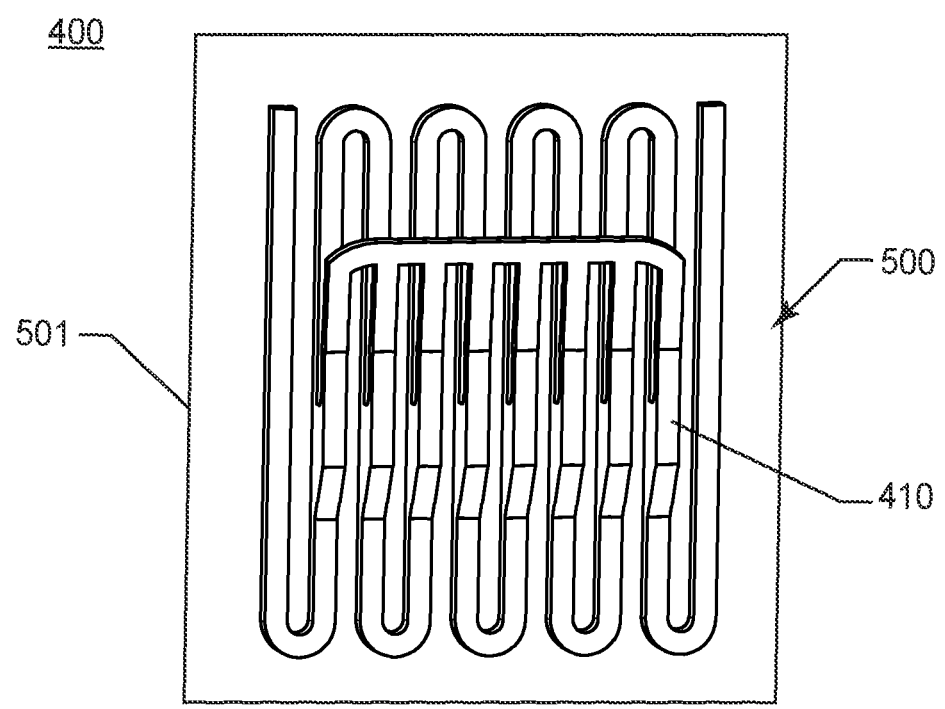
FIG. 7 is a perspective view of another embodiment of an exemplary adhesive article of the type generally described herein, with the body segments coupled to a backplate.

Another exemplary embodiment of an adhesive article 400 is depicted in FIG. 7. Except as otherwise noted, all other considerations regarding the adhesive articles 100 and 200 apply equally to adhesive article 400. The adhesive article 400 includes a flexible body 410 including a plurality of body segments 420, each including a linear segment 422 and a shared connector 430. The adhesive article further includes a backplate 500 coupled to the rear major surface 412 of the flexible body.

The backplate 500 extends beyond the periphery of the flexible body 410 and includes a length and width each exceeding the corresponding dimensions of the flexible body 410. The thickness of the backplate 500 is typically less than the corresponding thickness of the body 410, allowing for greater flexibility despite the typically monolithic nature of the backplate 500. An adhesive layer (not shown) can be affixed to a rear major surface 511 of the backplate 500.

The backplate may be advantageous in obscuring an aesthetically undesirable adhesive layer and may provide additional rigidity to the adhesive article to aid in bearing the weight of a mounted object. The backplate may be integrally made with the flexible body or may be made separately and affixed thereafter; an integral backplate is presently preferred.

Constituent elements of the adhesive mounting articles of the present disclosure will be explored in more detail below.

Flexible Body

In some embodiments, the flexible body is made from of thermoplastic polymers. In some embodiments, the flexible body is made from thermoset polymers. In some embodiments, the flexible body is made using polyolefin materials. In some embodiments, the flexible body is made using polycarbonate materials. In some embodiments, the flexible body is made using high-impact polystyrene (HIP). In some embodiments, the flexible body is made using acrylonitrile-butadiene-styrene (ABS) terpolymers. In some embodiments, the flexible body is made of polyetheretherketone (PEEK). In some embodiments, the flexible body is made from nylon. In some embodiments, the flexible body is made using two or more polymeric materials. In some embodiments, the flexible body is made from metal. In some embodiments, the flexible body is made from stainless steel. In some embodiments, the metal is painted, glazed, stained, brushed, or coated to alter its appearance. In some embodiments the flexible body is made from ceramic. In some embodiments, the flexible body is made from glazed ceramic. In some embodiments, the flexible body is made from unglazed ceramic. In some embodiments, the flexible body is comprised of naturally-based materials such as wood, bamboo, particle board, cloth, canvas, or derived from biological sources, and the like. In some embodiments, the naturally-based materials may be painted, glazed, stained, or coated to change their appearance. In some embodiments, the flexible body is made using two or more materials from the list above. In some embodiments, the flexible body is made from two pieces that are reversibly or irreversibly attached, joined, or welded together.

The flexible body can be made of a rigid material such as, for example, thermoplastic materials including polycarbonate, polyesters, and ABS. In some embodiments, depending on the exact application, rigid polyvinyl chloride, HIP, PEEK, or nylon may be used. It is to be understood that the flexible body can be made of any suitable material providing appropriate loading strength in the y-direction.

The flexible body can be made using any method known in the art. In presently preferred implementations, the flexible body is made as an integrate unit by injection molding, additive manufacturing (e.g., 3D printing, selective laser sintering, selective laser melting, rapid prototyping, etc.) resin transfer molding, compression molding, and the like.

In some embodiments, the flexible body comprises two pieces wherein the first piece acts as a mounting surface for attaching the adhesive article to a substrate, and the second piece acts as a hanging member which may be used for hanging or mounting objects to the substrate. The two pieces may be reversibly attached using mechanical fasteners, hook and loop materials, or an additional adhesive layer.

In some embodiments, the peelable adhesive layer(s) may be attached to the flexible body using a lamination process. In some embodiments, the peelable adhesive layer(s) and body may be attached to the flexible body using multiple lamination processes.

In some embodiments, the mounting projection may be attached to the flexible body using two or more injection molding steps in using one or more molds.

In some embodiments, the peelable adhesive layer(s) may be attached manually by the end user.

Peelable Adhesive Layer(s)

The adhesives used in the adhesive articles described herein can include any adhesive having the desired properties. In some embodiments, the adhesive is peelable. In some embodiments, the adhesive releases cleanly from the surface of an adherend when the adhesive article is peeled at an angle of about 35° or less from a surface of the adherend. In some embodiments, the peelable adhesive releases from a surface of an adherend when an article is peeled at an angle of about 35° or greater from the adherend surface such that there are substantially no traces of the adhesive left behind on the surface of the adherend.

The adhesive can be, for example, any of the adhesives described in any of the following patent applications, all of which are incorporated by reference herein: International Publication Nos. WO/2015/035556, WO/2015/035960, WO/2017/136219, WO/2017/136188 and U.S. Patent Application No. 2015/034104, all of which are incorporated herein in their entirety.

In some embodiments, the peelable adhesive is a pressure sensitive adhesive. Any suitable composition, material or ingredient can be used in the pressure sensitive adhesive. A general description of useful pressure sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Pressure sensitive adhesive compositions are well known to those of ordinary skill in the art to possess properties including the following: (1) tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Suitable PSAs may be based on crosslinked or non-crosslinked (meth)acrylics, rubbers, thermoplastic elastomers, silicones, polyurethanes, and the like, and may include tackifiers in order to provide the desired tac, as well as other additives. In some embodiments, the PSA is based on a (meth)acrylic PSA or at least one poly(meth)acrylate, where (meth)acrylate refers to both acrylate and methacrylate groups. In some embodiments, the PSA is an olefin block copolymer based adhesive. Acrylic based pressure sensitive adhesives are described in U.S. Pat. No. 4,726,982 (Traynor et al.) and in U.S. Pat. No. 5,965,256 (Barrera), for example. Silicone based pressure sensitive adhesives are described in U.S. Pat. No. 6,730,397 (Melancon et al.) and U.S. Pat. No. 5,082,706 (Tangney), and U.S. Provisional Application No. 62/721,958, filed Aug. 23, 2018 and assigned to the present assignee, for example. Polyurethane based pressure sensitive adhesives are described in U.S. Pat. Appl. Pub. No. 2005/0137375 (Hansen et al.), for example. Olefin block copolymer based pressure sensitive adhesives are described in U.S. Pat. Appl. Pub. No. 2014/0335299 (Wang et al.), for example.

Exemplary pressure sensitive adhesives utilize one or more thermoplastic elastomers, e.g., in combination with one or more tackifying resins. In some embodiments, the adhesive is not a pressure sensitive adhesive.

In some embodiments, the peelable adhesive layer can include at least one of rubber, silicone, or acrylic based adhesives. In some embodiments, the peelable adhesive layer can include a pressure-sensitive adhesive (PSA). In some embodiments, the peelable adhesive can include tackified rubber adhesives, such as natural rubber; olefins; silicones, such as silicone polyureas or silicone block copolymers; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques; polyurethanes; silicone block copolymers; and combinations of the above.

Generally, any known additives useful in the formulation of adhesives may also be included. Additives include plasticizers, anti-aging agents, ultraviolet stabilizers, colorants, thermal stabilizers, anti-infective agents, fillers, crosslinkers, as well as mixtures and combinations thereof. In certain embodiments, the adhesive can be reinforced with fibers or a fiber scrim which may include inorganic and/or organic fibers. Suitable fiber scrims may include woven-, non-woven or knit webs or scrims. For example, the fibers in the scrim may include wire, ceramic fiber, glass fiber (for example, fiberglass), and organic fibers (for example, natural and/or synthetic organic fibers).

In some embodiments, the adhesive includes a tackifier. Some exemplary tackifiers include at least one of polyterpene, terpene phenol, rosin esters, and/or rosin acids.

In some embodiments, the peelable adhesive is a flowable adhesive that can be coated onto the backing. In some embodiments, the peelable adhesive is a more solid adhesive as is generally described in, for example, German Patent No. 33 31 016.

In some embodiments, the peelable adhesive has a $T_g$ of between about −125 degrees Celsius and about 20 degrees Celsius, as determined by dynamic mechanical analysis of the tan δ peak value. In some embodiments, the peelable adhesive has a $T_g$ of between about −70 degrees Celsius and about 0 degrees Celsius. In some embodiments, the peelable adhesive has a $T_g$ of between about −60 degrees Celsius and about −20 degrees Celsius. In some embodiments, the peelable adhesive has a $T_g$ of greater than −80 degrees Celsius, greater than −70 degrees Celsius, greater than −60 degrees Celsius, greater than −50 degrees Celsius, greater than −40 degrees Celsius, or great than −30 degrees Celsius. In some embodiments, the peelable adhesive has a $T_g$ of less than 20 degrees Celsius, 10 degrees Celsius, 0 degrees Celsius, −10 degrees Celsius, −20 degrees Celsius, or −30 degrees Celsius.

Some peelable adhesives that can be used in the adhesive articles of the present disclosure have a storage modulus of about 300,000 Pa or greater, about 400,000 Pa or greater, about 500,000 Pa or greater, about 1,000,000 Pa or greater at 25° C., as determined by dynamic mechanical analysis. In other embodiments, the adhesive has a storage modulus of 750,000 Pa or less, 500,000 Pa or less, 400,000 Pa or less, 300,000 Pa or less, or 250,000 Pa or less at 25° C., as determined by dynamic mechanical analysis. In some embodiments, the thickness of the peelable adhesive on at least one of the first or second major surfaces of the core is about 1 μm to about 1 mm.

In some embodiments, adhesion properties of the adhesive can range from 0.1 N/dm to 25 N/dm. In some embodiments, adhesion properties of the adhesive can range from 0.5 N/dm to 10 N/dm. In some embodiments, adhesion properties of the adhesive can range from 1 N/dm to 5 N/dm.

In some embodiments, the peelable adhesive can provide a shear strength of, for example, 1-20 pounds per square inch as measured by ASTM Test Method D3654M-06.

In some embodiments, the peelable adhesives are tailored to achieve peel with no or minimal damage. Exemplary methods and articles for doing so are described in, for example, U.S. Pat. No. 6,835,452, International Publication Nos. WO/2018/039584 and WO/2017/136188, each incorporated herein in their entirety.

Adhesive Article(s)

In some embodiments, the adhesive article further includes one or more release liners. The release liner can be, for example, on either or both of the major surfaces of the adhesive layers. The release liner protects the adhesive during manufacturing, transit, and before use. When the user desires to use the adhesive article, the user can peel or remove the release liner to expose the adhesive. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048, and incorporated herein. Preferred release liners are fluoroalkyl silicone polycoated paper. The release liners can be printed with lines, brand indicia, or other information.

In some embodiments, the adhesive articles of the present disclosure can be removed from a substrate or surface without damage. In particularly advantageous embodiments, the adhesive articles can be removed from at least one of painted drywall and wallpaper without damage.

Some adhesive articles of the present disclosure have excellent shear strength. Some embodiments of the present disclosure have a shear strength of greater than 1600 minutes as measured according to ASTM D3654-82. Some embodiments of the present disclosure have shear strength of greater than 10,000 minutes as measured according to ASTM D3654-82. Some other embodiments of the present disclosure have shear strength of greater than 100,000 minutes as measured according to ASTM D3654-82.

Some adhesive articles of the present disclosure demonstrate a lower peel adhesion to make the adhesive article easier to remove. Others demonstrate a higher peel adhesion, yet still provide for damage free removal. Some adhesive articles of the present disclosure can have a higher peel adhesion as to permit handling of the adhesive article by the user without accidental separation. Some embodiments of the present disclosure have a peel adhesion between about 5 oz/in to 50 oz/in. Some embodiments of the present disclosure have a peel adhesion between about 10 oz/in to 40 oz/in. Some embodiments of the present disclosure have a peel adhesion between about 15 oz/in to 30 oz/in.

Some adhesive articles of the present disclosure demonstrate improved weight bearing capacity, holding a 10 lbs weight for at least 72 hours. In presently preferred embodiments, the adhesive articles of the present disclosure demonstrate improved weight bearing capacity, holding a 10 lbs weight for at least one week. In presently preferred embodiments, the adhesive articles of the present disclosure demonstrate improved weight bearing capacity, holding a 10 lbs weight for at least two weeks.

Some adhesive articles of the present disclosure have a tensile strength at break sufficiently high so that the adhesive article will not rupture prior to being removed from an adherend at an angle of 35° or greater.

In some embodiments, the adhesive articles of the present disclosure exhibit enhanced conformability to a substrate or surface than prior art adhesive mounting articles. In some embodiments, the adhesive articles of the present disclosure hold more weight when adhered or attached to a substrate or surface than prior art adhesive mounting articles. In some embodiments, the adhesive articles of the present disclosure hold more weight for a longer period of time when adhered or attached to a substrate or surface than prior art adhesive mounting articles. In some embodiments, the adhesive articles of the present disclosure remain adhered to a textured, rough, or irregular surface for a longer period of time than prior art adhesive mounting articles. In some embodiments, the adhesive articles of the present disclosure hold a higher amount of weight when adhered to a textured, rough, or irregular surface than prior art adhesive mounting articles.

Adhesive articles of the present disclosure can advantageously provide enhanced weight bearing capability with a reduction or elimination of substrate damage on removal. Accordingly, presently preferred embodiments of the present disclosure demonstrate effective weight bearing capacity, a stronger adhesion per square inch of available adhesive area, and peel-removability from a painted drywall substrate without damage. Moreover, at least one of the flexible body and adhesive layer can typically be reused after removal of the article from an adherend. Typically, the flexible body can be repurposed for use with a new adhesive layer. In other embodiments, the entire adhesive article is repositionable or reusable.

Method of Making the Adhesive Articles Described Herein

The adhesive articles described herein can be made in various ways. One embodiment involves disposing an adhesive onto or adjacent to a major surface of a flexible body.

The adhesive can be disposed on the flexible body in any known way, including, for example, the pressure sensitive adhesive composition can be coated onto a release liner, coated directly onto a body, or formed as a separate layer (e.g., coated onto a release liner) and then laminated to a body. An adhesive can be deposited onto the flexible body with a known deposition method, including, e.g., solvent coating methods, water-borne coating methods, or hot melt coating methods, e.g., knife coating, roll coating, reverse roll coating, gravure coating, wire wound rod coating, slot orifice coating, slot die coating, extrusion coating, or the like.

Methods of Using the Adhesive Articles Described Herein

The peelable articles of the present disclosure can be used in various ways. In some embodiments, the adhesive article is applied, attached to, or pressed into an adherend. In this way, the adhesive article contacts the adherend. Where a release liner is present, the release liner is removed before the adhesive article is applied, attached to, or pressed into an adherend. In some embodiments, at least a portion of the adherend is wiped with alcohol before the adhesive article is applied, attached to, or pressed into an adherend.

To remove the adhesive article from the adherend, at least a portion of the adhesive article is peeled or stretched away from the adherend. In some embodiments, the flexible body and adhesive are removed together. In other embodiments, the flexible is removed first in order to access the adhesive layer.

The adhesive articles can be used in isolation, as one of many articles attached to a surface, or as part of a stack of adhesive articles. In the latter implementation, the resulting construction would include a plurality of adhesive articles disposed in vertical relation to one another.

Uses

The adhesive articles may be used in wet or high humidity environments such as those found in bathrooms. For example, they can be adhered to toilets (e.g., toilet tanks), bathtubs, sinks, and walls. The adhesive article may be used in showers, locker rooms, steam rooms, pools, hot tubs, and kitchens (e.g., kitchen sinks, dishwashers and back splash areas, refrigerators and coolers). The adhesive article may also be used in low temperatures applications including outdoor applications and refrigerators. Useful outdoor applications include bonding articles such as signage to outdoor surfaces such as windows, doors and vehicles.

The adhesive articles may be used to mount various items and objects to surfaces such as painted drywall, plaster, concrete, glass, ceramic, fiberglass, metal or plastic. Items that can be mounted include, but are not limited to, wall hangings, organizers, holders, baskets, containers, decorations (e.g., holiday decorations), calendars, posters, dispensers, wire clips, body side molding on vehicles, carrying handles, signage applications such as road signs, vehicle markings, transportation markings, and reflective sheeting.

Adhesive articles can also be initially repositionable and may even be reusable in some iterations until one of the adhesive layers loses tack. As used herein, "repositionable" means an adhesive article that can be applied to a substrate and then removed and reapplied without distorting, defacing, or destroying the adhesive article, or substrate.

This application is a continuation of U.S. patent application Ser. No. 17/296,414 (published as U.S. Patent Application Publication US2022/022668), now allowed, which was a national stage filing under 35 U.S.C. 371 of PCT Application No. PCT/IB2019/061033 (published as International Patent Application Publication WO2020/128911), which claimed priority to U.S. Provisional Application 62/781,888, the disclosures of all of which are incorporated by reference in their entirety herein.

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof.

Further, various modifications and alterations of the present invention will become apparent to those skilled in the art without departing from the spirit and scope of the invention. The scope of the present application should, therefore, be determined only by the following claims and equivalents thereof.

We claim:

1. A flexible article for use with a pressure-sensitive adhesive layer in mounting an object to a surface, the flexible article comprising:

a flexible molded body with a longitudinal direction and a transverse direction and a frontward side and a rearward side and having a plurality of discrete body segments arranged at a defined pitch, wherein the flexible molded body is more rigid in the longitudinal direction than in the transverse direction, and a flexible backplate that has a frontward major face and a rearward major face, that is located on the rearward side of the molded body, and that is a molded backplate that is monolithic with the flexible molded body, and wherein the rearward major surface of the flexible molded backplate is configured to have a pressure-sensitive adhesive layer affixed thereto, wherein the discrete body segments are elongate with a long axis that is at least generally aligned with the longitudinal direction of the flexible molded body and wherein each discrete body segment comprises a rearward face, the rearward faces of the discrete body segments being in integral contact with areas of the frontward major face of the flexible molded backplate, and wherein the flexible molded body comprises a frontwardly-extending mounting projection that is a molded mounting projection that is monolithic with the flexible molded body and that is collectively provided by a plurality of discrete mounting segments, each discrete mounting segment extending from a respective discrete body segment and each discrete mounting segment being elongate with a long axis that is at least generally aligned with the longitudinal direction of the flexible molded body.

2. The flexible article of claim 1, wherein each discrete body segment of the plurality of discrete body segments includes a linear segment and wherein all of the linear segments of the discrete body segments are arranged in parallel to one another.

3. The flexible article of claim 1, wherein the frontwardly-extending mounting projection defines a recess between the frontwardly-extending mounting projection and the discrete body segments, the recess being closed-ended at a lower end of the recess and open-ended at an upper end of the recess.

4. The flexible article of claim 1, wherein the discrete mounting segments collectively form a hook.

5. The flexible article of claim 1, wherein the discrete body segments are oriented perpendicular to the transverse direction of the flexible molded body.

6. The flexible article of claim 1, wherein the discrete body segments each exhibit a length to width ratio of at least 15:1.

7. The flexible article of claim 1, wherein the discrete body segments are spaced at a uniform pitch along the transverse direction of the flexible molded body.

8. The flexible article of claim 1, wherein the discrete body segments each exhibit a thickness, in a frontward-rearward direction of the flexible molded body, that varies along the longitudinal direction of the flexible molded body, with the thickness being smaller toward longitudinal edges of the flexible molded body and being greater toward a longitudinal center of the flexible molded body.

9. The flexible article of claim 1, wherein the discrete body segments exhibit a thickness and wherein the flexible molded backplate exhibits a thickness, both thicknesses being in a frontward-rearward direction of the molded body and of the backplate, and wherein the thickness of the flexible molded backplate is less than the thickness of the discrete body segments.

10. The flexible article of claim 1, wherein at least one of the discrete body segments comprises an end that is integrally, directly connected to an end of an adjacent discrete body segment by way of a backplate portion that is between, and is integrally connected to, the end of the discrete body segment and the end of the adjacent discrete body segment.

11. The flexible article of claim 1, wherein at least some discrete body segments of the plurality of discrete body segments each comprise an end that is integrally, directly connected to an end of an adjacent discrete body segment by way of a backplate portion that is between, and is integrally connected to, the end of the discrete body segment and the end of the adjacent discrete body segment.

12. The flexible article of claim 11, wherein at least some of the discrete body segments each comprise an end that is not directly connected to any nearest-neighbor end of any discrete body segment other than by way of a backplate portion that is between, and is integrally connected to, the end of the discrete body segment and the nearest-neighbor end of the adjacent discrete body segment.

13. The flexible article of claim 1, wherein the discrete body segments are exposed discrete body segments that are not buried or encapsulated within the flexible molded backplate or within any other item.

14. The flexible article of claim 1, wherein the discrete mounting segments are each elongate with the long axis of each discrete mounting segment being oriented at least generally along the longitudinal direction of the flexible molded body and with all of the discrete mounting segments being parallel to one another.

15. The flexible article of claim 14, wherein at least some of the discrete mounting segments are each transversely spaced apart from any neighboring discrete mounting segment along at least 80% of a length of the discrete mounting segment, so that a transverse gap is present between each discrete mounting segment and any of the neighboring discrete mounting segments, each transverse gap being elongated in the longitudinal direction of the flexible molded body and extending along at least 80% of the length of the discrete mounting segment.

16. The flexible article of claim 14, wherein all of the discrete mounting segments are transversely spaced apart from each other along at least 80% of the lengths of the discrete mounting segments so that transverse gaps are present between all of the discrete mounting segments, all of the transverse gaps being elongated in the longitudinal direction of the flexible molded body and extending along at least 80% of the length of the discrete mounting segments.

17. The flexible article of claim 1, wherein the rearward faces of the discrete body segments collectively define a common plane that is in integral contact with the areas of the frontward major face of the flexible molded backplate.

18. The flexible article of claim 1, wherein at least some of the discrete mounting segments comprise a linear portion with a long axis that is aligned with the longitudinal direction of the flexible molded body, and wherein for each discrete mounting segment, the linear portion of the discrete mounting segment terminates at an upper end that defines an upper end of the discrete mounting segment, with the upper ends of the linear portions collectively providing an upper end of the frontwardly-extending mounting projection.

19. The flexible article of claim 1, wherein each of the discrete mounting segments extends from a respective one of the discrete body segments, with none of the discrete mounting segments extending from more than one of the discrete body segments and with none of the discrete body segments having more than one of the discrete mounting segments extending from it.

20. The flexible article of claim 19, wherein the discrete body segments are spaced at a uniform pitch along a transverse extent of the flexible molded body and wherein the discrete mounting segments are spaced at the same uniform pitch as the discrete body segments.

21. The flexible article of claim 1, wherein the discrete mounting segments each comprise a rearward face, and wherein the rearward faces of the discrete mounting segments define a common plane that is aligned parallel with a common plane collectively defined by rearward faces of the discrete body segments.

22. The flexible article of claim 1, wherein the discrete mounting segments collectively define a recess between the frontwardly-extending mounting projection and the discrete body segments, with the recess exhibiting a frontward-rearward gap, between rearward faces of the discrete mounting segments and frontward faces of the discrete body segments, that is constant along a transverse extent of the recess.

23. An adhesive article comprising the flexible article of claim 1 with a pressure-sensitive adhesive layer affixed to the rearward major surface of the flexible molded backplate of the flexible article.

24. The adhesive article of claim 23 wherein the pressure-sensitive adhesive layer is a peelable pressure-sensitive adhesive layer.

25. A method of forming an adhesive article from the flexible article of claim 1 and adhesively attaching the adhesive article to a surface of an adherend, the method comprising:
affixing a pressure-sensitive adhesive layer to the rearward major surface of the flexible molded backplate of the flexible article to form an adhesive article,
orienting the adhesive article so that the longitudinal direction of the flexible molded body is oriented at least generally vertically and so that an exposed rearward surface of the pressure-sensitive adhesive layer faces the surface of the adherend,
and,
pressing the adhesive article against the surface of the adherend so that the rearward surface of the pressure-sensitive adhesive layer becomes adhesively bonded to the surface of the adherend.

26. The method of claim 25 comprising the further step of connecting an object to the frontwardly-extending mounting projection of the flexible article of the adhesive article so that the object is mounted on the adherend with the adhesive article supporting the weight of the object.

27. The method of claim 25 wherein multiple pressure-sensitive adhesive layers are affixed to rearward major surfaces of multiple flexible molded backplates of multiple flexible articles to form multiple adhesive articles, wherein the multiple adhesive articles are adhesively bonded to the surface of the adherend by way of the multiple pressure-sensitive adhesive layers, and wherein an object is connected to frontwardly-extending mounting projections of the flexible articles of the adhesive articles so that the multiple adhesive articles are used in combination to collectively support the weight of the object.

28. The method of claim 25 comprising a further step of detaching the adhesive article from the surface of the adherend by peeling the pressure-sensitive adhesive layer off of the surface of the adherend.

\* \* \* \* \*